United States Patent
Lin et al.

(10) Patent No.: US 7,423,621 B2
(45) Date of Patent: Sep. 9, 2008

(54) DRIVING CIRCUIT OF A LIQUID CRYSTAL DISPLAY DEVICE

(75) Inventors: Wen-Chieh Lin, Tainan Hsien (TW); Hsin-Ta Lee, Tainan Hsien (TW)

(73) Assignee: Chi Mei Optoelectronics Corporation, Tainan County (TW)

( * ) Notice: Subject to any disclaimer, the term of this patent is extended or adjusted under 35 U.S.C. 154(b) by 565 days.

(21) Appl. No.: 10/250,267

(22) Filed: Jun. 19, 2003

(65) Prior Publication Data

US 2003/0234760 A1 Dec. 25, 2003

(30) Foreign Application Priority Data

Jun. 25, 2002 (TW) .............................. 91113832 A (51) Int. Cl.
*G09G 3/36* (2006.01)
(52) U.S. Cl. .......................................... 345/98; 345/87
(58) Field of Classification Search ........................ None
See application file for complete search history.

(56) References Cited

U.S. PATENT DOCUMENTS 5,642,017 A * 6/1997 Hush ........................ 315/169.3
6,211,849 B1 * 4/2001 Sasaki et al. ................... 345/55
6,937,233 B2 * 8/2005 Sakuma et al. ............... 345/211
6,982,706 B1 * 1/2006 Doi et al. ..................... 345/206
2001/0028337 A1 * 10/2001 Wu et al. ..................... 345/100

FOREIGN PATENT DOCUMENTS

JP 2002-213655 7/2002
JP 2002-267054 9/2002

OTHER PUBLICATIONS

International Search Report dated Dec. 29, 2004.

* cited by examiner

*Primary Examiner*—Sumati Lefkowitz
*Assistant Examiner*—Srilakshmi K. Kumar
(74) *Attorney, Agent, or Firm*—Winston Hsu (57) ABSTRACT

A driving circuit for improving display quality of a liquid crystal display (LCD) device. The driving circuit is installed on a surface of a glass substrate of the LCD device and includes a bus line and a plurality of driving IC chips. The driving circuit also includes a plurality of impedance matchers between the bus line and each of the driving IC chips so as to make each driving IC chip obtain equal input voltage from the bus line.

25 Claims, 7 Drawing Sheets

DRIVING CIRCUIT OF A LIQUID CRYSTAL DISPLAY DEVICE

BACKGROUND OF INVENTION

1. Field of the Invention

The present invention relates to a driving circuit for improving display quality of an LCD, and more particularly, to a driving circuit of a WOA (wiring on array) LCD device.

2. Description of the Prior Art

Liquid crystal displays, characterized by small size, low power consumption, and no radiation, have been broadly applied in portable information products such as notebook and PDA. It is likely that LCDs will replace CRT monitors in many settings.

In the driving circuit of LCDs of the prior art, the driving IC chips are packaged on the surface of a plurality of tape carrier packages (TCPs).

The TCPs are then electrically connected to a printed circuit board and a bottom glass substrate so as to ensure that the controlling signal from the printed circuit board can be sent to each driving IC chip via the TCPs, and thereafter be sent to the bottom glass substrate. Further, because of the high cost of the material, packaging, and testing of TCPs, a COG (chip on glass) or WOA (wiring on array) LCD is developed to reduce manufacturing cost and to increase product reliability.

Figure 1:
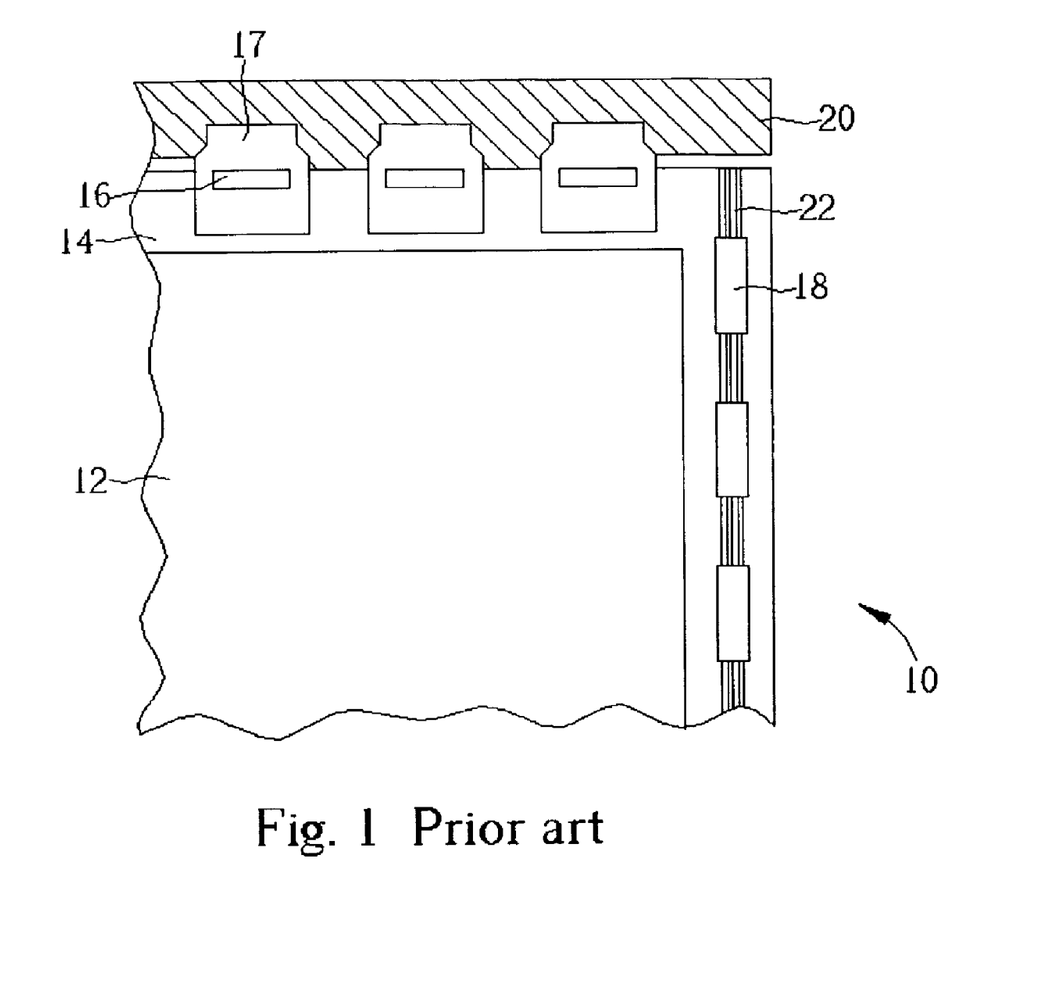
FIG. 1 is a schematic diagram of a WOA LCD of the prior art.

Please refer to FIG. 1. As shown in FIG. 1, an LCD device, which adopts the COG or WOA design in a side (usually the scan line circuit side), comprises an LCD panel 10 and a first driving circuit for driving the LCD panel 10. The LCD panel is composed of a top glass substrate 12 and a bottom glass substrate 14. The first driving circuit comprises a plurality of driving IC chips 16 respectively packed on tape carrier packages (TCPs) 17 and electrically connected to the bottom glass substrate. The TCPs 17 are also electrically connected to the printed circuit board 20.

The LCD includes a second driving circuit comprising a bus line 22 installed on the surface of the bottom glass substrate 14. The second driving circuit also comprises a plurality of driving IC chips 18 installed on the surface of the bottom glass substrate and above the bus line 22 by employing chip-on-glass (COG) method. Each driving IC chip 18 comprises a plurality of input pads (not shown) for electrically connecting to the bus line 22, and each driving IC chip 18 is serially connected to the bus line 22.

The resistance of the conductive wire of the bus line 22 (for electrically connecting to the driving IC chips) formed on the surface of the bottom glass substrate is very large, therefore when a driving voltage of a controlling signal is sent from the printed circuit board 20, through the TCPs 17, the bus line 22, and to each driving IC chip 18, each driving IC chip would have a different voltage drop according to the position. This causes an evident diversity in the color, brightness, and contrast performance if the display color is sensitive (such as gray) when the driving IC chips 18 drive the LCD panel 10. In other words, the voltage drop inequality as a result of the resistance of the bus line 22 will make the equally inputted voltage decrease progressively so as to the display quality deteriorates.

SUMMARY OF INVENTION

It is therefore a primary objective of the claimed invention to provide a driving circuit of LCD that can improve the display quality and solve the above-mentioned problem.

According to the claimed invention, a special driving circuit is provided. The driving circuit comprises a bus line installed on the surface of the LCD glass substrate and a plurality of driving IC chips installed above or alongside the bus line. A plurality of impedances matchers are installed between the bus line and each driving IC chips, and each impedance matcher is inversely proportional to a voltage drop of the bus line electrically connected to the driving IC chips. This allows each driving IC chip to obtain an equal final input voltage from the bus line and solve the color diversity problem of the LCD.

These and other objectives of the present invention will no doubt become obvious to those of ordinary skill in the art after having read the following detailed description of the preferred embodiment that is illustrated in the various figures and drawings.

DETAILED DESCRIPTION

The present invention provides driving circuits that can improve the LCD display quality. The LCD is a WOA (wiring on array) LCD. As shown in FIG. 1, the LCD of the present invention has an appearance as a general WOA LCD, which comprises a top glass substrate 12, a bottom glass substrate 14, and a liquid crystal layer (not shown) sealed between the top and bottom glass substrate. The LCD panel is composed of the top and bottom glass substrate. The LCD of the present invention further comprises a driving circuit for driving the LCD display 10. The driving circuit comprises a bus line 22, composed of at least a metal conductive wire, installed on the surface of the bottom glass substrate 14, and a plurality of driving IC chips 18 installed above or alongside the bus line 22 on the surface of the bottom glass substrate 14. Each driving IC chip 18 comprises at least an input pad (not shown) for electrically connecting to the bus line 22.

The driving circuit in the present invention is to install a plurality of impedance matchers (not shown in FIG. 1) between the bus line 22 and the corresponding driving IC chips. Each impedance matcher is installed alongside or below the corresponding driving IC chips, and connected to the bus line 22 and the input pad of each driving IC chip. Wherein each impedance matcher is a resistant composed of a zigzag metal wire or an ITO layer, and a resistance value of each driving IC chip varies from the position of the corresponding driving IC chip.

Figure 2:
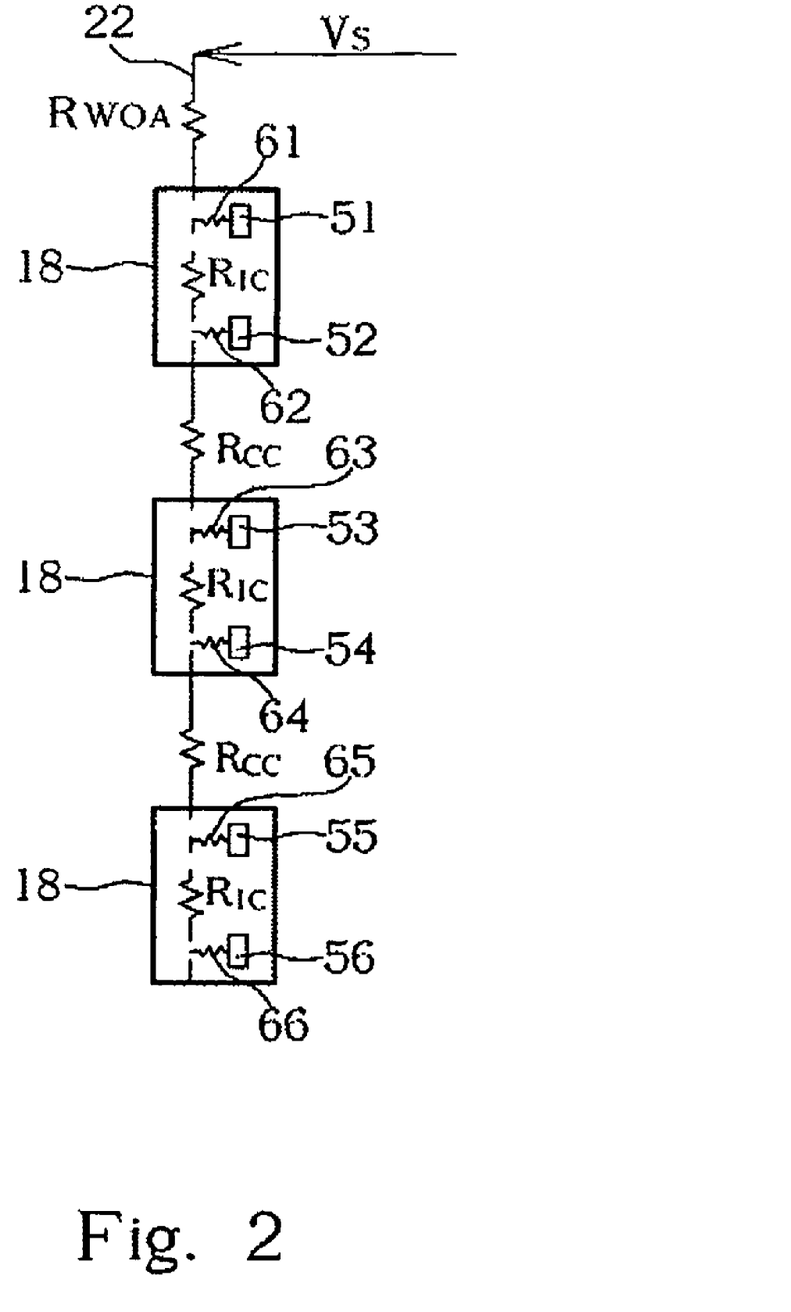
FIG. 2 is a diagram of a driving circuit in the first embodiment of the present invention.

Take a driving circuit comprising 3 driving IC chips 18 for example. Please refer to FIG. 2. FIG. 2 is a diagram of the driving circuit in the first embodiment of the present invention. Each driving IC chip 18 is electrically connected to the bus line 22 via two input pads, and impedance matchers 61-66 are installed between the bus line 22 and the corresponding input pads 51-56. In other words, quantities of impedance matchers and input pads are equal.

When a driving voltage $V_s$ is sent from the printed circuit board 20, through the bus line 22, through the impedance matchers 61-66, and to the input pad 51-56 of the driving IC chips 18, provided that the impedance matcher 61-66 will consume 0.5 units current, the input voltage obtain by the input pads 51-56 can be shown as follows:
$V_{IN1} = V_s - 3 \times R_{WOA} - 0.5 \times R_{B1}$
$V_{IN2} = V_s - 3 \times R_{WOA} - 2.5 \times R_{IC} - 0.5 \times R_{B2}$
$V_{IN3} = V_s - 3 \times R_{WOA} - 2.5 \times R_{IC} - 2 \times R_{CC} - 0.5 \times R_{B3}$
$V_{IN4} = V_s - 3 \times R_{WOA} - 4 \times R_{IC} - 2 \times R_{CC} - 0.5 \times R_{B4}$
$V_{IN5} = V_s - 3 \times R_{WOA} - 4 \times R_{IC} - 3 \times R_{CC} - 0.5 \times R_{B5}$
$V_{IN6} = V_s - 3 \times R_{WOA} - 4.5 \times R_{IC} - 3 \times R_{CC} - 0.5 \times R_{B6}$ Wherein $V_{IN1}$-$V_{IN6}$ represent the voltage inputted to the input pads 51-56, $R_{WOA}$ represents the resistance of the conductive wire electrically conducting the printed circuit board 20 and the input pad 51, $R_{IC}$ represents the resistance of the bus line 22 below the driving IC chips 18, $R_{CC}$ represents the resistance of the bus line 22 electrically connected to the driving IC chips, and $R_{B1}$-$R_{B6}$ represent the resistances of the impedance matchers 61-66 electrically connected to the input pads 51-56.

It is a most preferred objective of the present invention to equalize the input voltage of each driving IC chip 18. That is to say the input voltage of each input pad must be equal: $V_{IN1} = V_{IN2} = V_{IN3} = V_{IN4} = V_{IN5} = V_{IN6}$, i.e. $0.5 \times R_{B1} = 2.5 \times R_{IC} + 0.5 \times R_{B2} = 2.5 \times R_{IC} + 2 \times R_{CC} + 0.5 \times R_{B3} = 4 \times R_{IC} + 2 \times R_{CC} + 0.5 \times R_{B4} = 4 \times R_{IC} + 3 \times R_{CC} + 0.5 \times R_{B5} = 4.5 \times R_{IC} + 3 \times R_{CC} + 0.5 \times R_{B6}$. $R_{IC}$ and $R_{CC}$ can be known by measurement (Ex. $R_{IC} = 10\Omega$ and $R_{CC} = 68\Omega$), and therefore the resistances $R_{B1}$-$R_{B6}$, (Ex. $R_{B1} = 498\Omega$, $R_{B2} = 448\Omega$, $R_{B3} = 176\Omega$, $R_{B4} = 146\Omega$, $R_{B5} = 10\Omega$, and $R_{B6} = 0\Omega$) of the impedance matchers 61-66 can be acquired through substitution in the equation. Finally, the length and width of the zigzag metal conductive wire or the ITO layer, the relative position of via plug (not shown) of the impedance matchers 61-66 and the bus line 22 are calculated so that the resistance value of the impedance matchers 61-66 can conform to $R_{B1}$-$R_{B6}$.

In the second embodiment of the present invention, a set of impedance matchers are installed below each driving IC chip, therefore two input pads of a same driving IC chip are electrically connected to same impedance matcher. In other words, quantities of impedance and driving IC chips are equal. A driving voltage $V_s$ is passed through the bus line and each impedance matcher then inputted to the corresponding driving IC chips via the two input pads. The resistance of the impedance matchers can be acquired by the same mathematical calculation.

Figure 3:
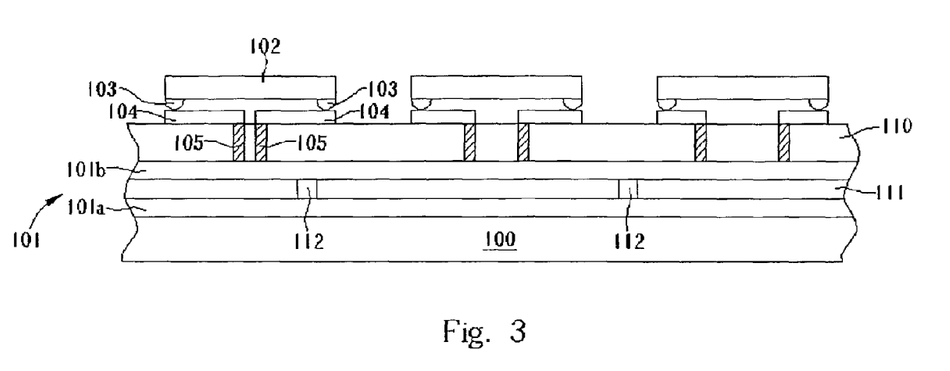
FIG. 3 is a schematic diagram of an impedance matcher in the first embodiment of the present invention.
Figure 4:
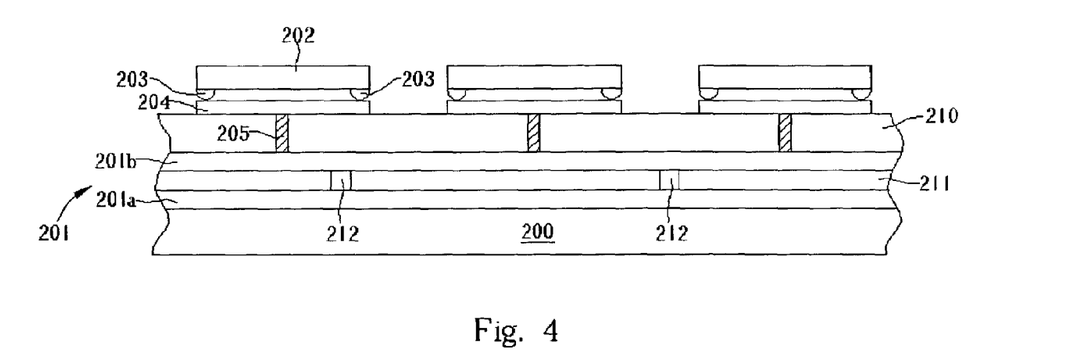
FIG. 4 is a schematic diagram of an impedance matcher in the second embodiment of the present invention.
Figure 6:
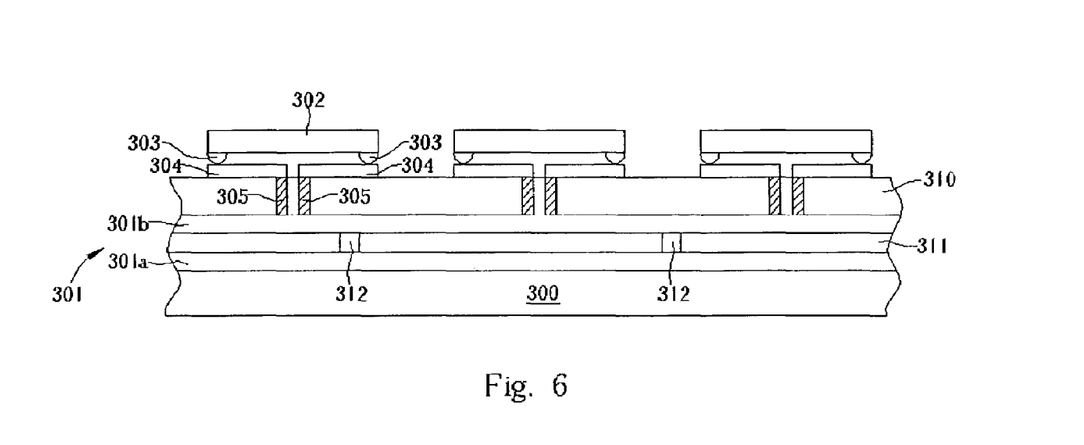
FIG. 6 is a schematic diagram of an impedance matcher in the third embodiment of the present invention.

FIG. 3, FIG. 4 and FIG. 6 are schematic diagrams of an impedance matcher in the first, second, and third embodiments of the present invention. As shown in FIG. 3, an LCD driving circuit comprises a bus line 101, composed of at least a metal conductive wire, installed on the surface of a glass substrate 100, and a plurality of driving IC chips 102 installed on the surface of the glass substrate 100 above the bus line 101. Each driving IC chip is electrically connected to the bus line 101 via two input pads through the impedance matcher 104 and via plug 105. In the first embodiment of the present invention, via plugs 105 are installed on the passivation layer 110 between the bus line 101 and the corresponding input pad 103, then a set of impedance matchers 104 are installed on the passivation layer 110 to electrically connect to via plugs 105 and input pads 103 so as to allow a driving voltage $V_s$ to be sent to the input pad 103 of each driving IC chip 102 through the bus line 101, via plug 105, and input pad 103. Wherein each impedance matcher 104 is a resistance composed of a zigzag metal wire or an ITO layer, the bus line is constituted by a first metal layer 101a and a second metal layer 101b, and the first metal layer 101a and the second metal layer 101b are electrically connected via a plurality of via plugs 112 installed in the dielectric layer 111 between two metal layers. Since the bus line 101 can be produced in thin film transistor (not shown) manufacturing processes, therefore the first metal layer 101a and the gate of the TFT (not shown) can be formed simultaneously, the dielectric layer 111 and the gate insulator of the TFT (not shown) can be formed simultaneously, and the second metal layer 101b and the source/drain of the TFT (not shown) can be formed simultaneously. Thereafter a passivation layer 110 is formed to protect the TFT (not shown) and the bus line 101. In the first embodiment of the present invention, the resistance value of each impedance matcher can be determined by adjusting the length (or width) of the zigzag wire or the ITO layer so as to it will be inversely proportional to the voltage drop of the bus line electrically connected to the input pad 103.

In the second embodiment of the present invention, an impedance matcher is shown in FIG. 4. An LCD driving circuit comprises a bus line 201, composed of at least a metal conductive wire, installed on the surface of the glass substrate 200, and a plurality of driving IC chips installed on the surface of the glass substrate 200 above the bus line 201. Each driving IC chip is electrically connected to the bus line 201 via two input pads 203. In the second embodiment, an impedance matcher 204 is installed between the passivation layer 210 and the corresponding driving IC chips 202. Thus each impedance matcher 204 is electrically connected to the bus line 201 and two input pads 203 of the corresponding driving IC chips 202. Also a via plug 205 is installed between the bus line 201 and the corresponding impedance matchers 205. The impedance matcher 204 is a resistance composed of a zigzag metal wire or an ITO layer, and each impedance matcher has a different resistance value. The more the voltage drop of the bus line electrically connected to the driving IC chips is, the less the resistance value of the impedance matcher corresponding to the driving IC chip is.

Figure 5:
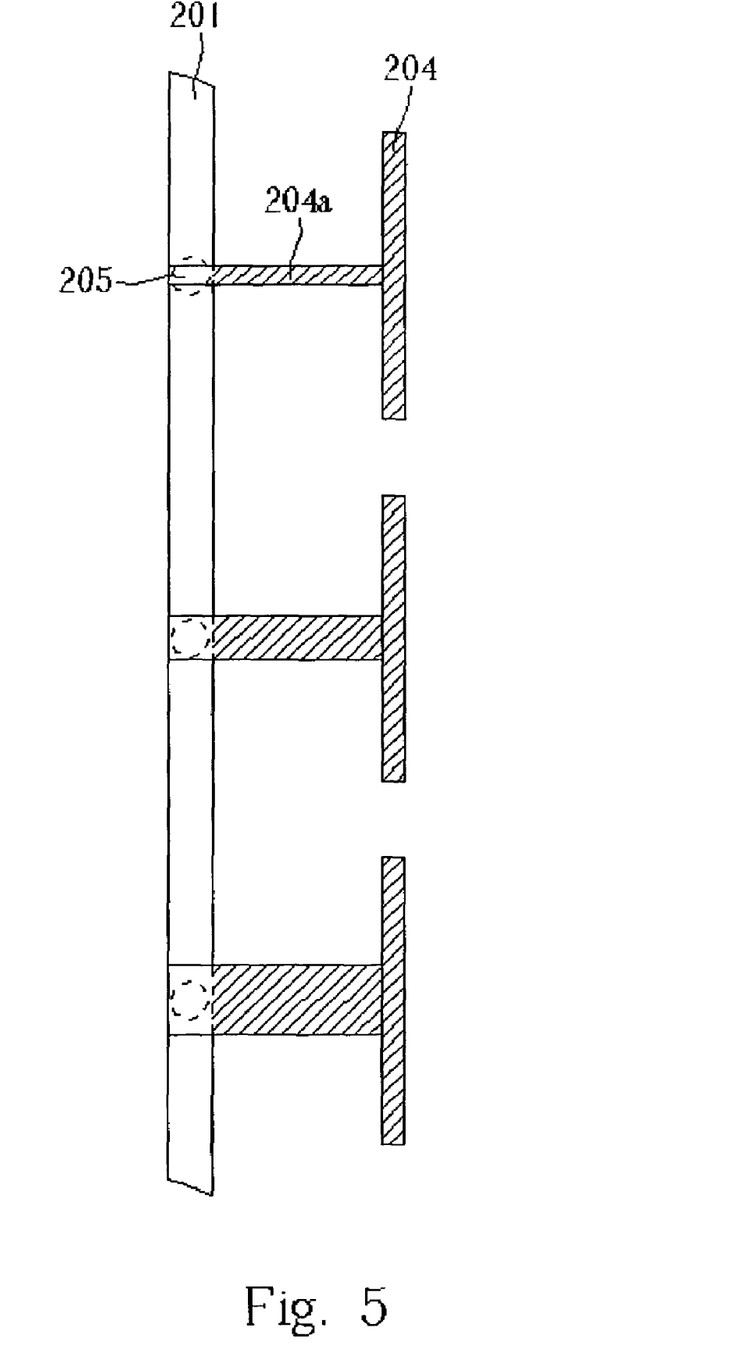
FIG. 5 is a top view of the impedance matcher shown in FIG. 4.

Similar to the first embodiment, the bus line 201 of the second embodiment is constituted by a first metal layer 201a and a second metal layer 201b, and the first metal layer 201a and the second metal layer 201b are electrically connected via a plurality of via plugs 212 installed in the dielectric layer 211 between two metal layers. The bus line 201 can be produced in thin film transistor (not shown) manufacturing processes, therefore the first metal layer 201a and the gate of the TFT can be formed simultaneously, the dielectric layer 211 and the gate insulator of the TFT (not shown) can be formed simultaneously, and the second metal layer 201b and the source/drain of the TFT (not shown) can be formed simultaneously. Thereafter a passivation layer 210 is formed to protect the TFT and the bus line 201. Differing from the first embodiment, the resistance of each impedance matcher 204 in the second embodiment is determined not only by adjusting the length (or width) of a zigzag metal wire and an ITO layer, but also by adjusting the cross-section area of a lateral branch installed on each impedance matcher 204. FIG. 5 is a top view of an impedance matcher shown in FIG. 4. As shown in FIG. 5, each via plug 205 is laterally connected to a corresponding impedance matcher branch 204a with a different cross-section area, then each branch 204a is electrically connected to the corresponding impedance matcher 204 approximately parallel to the bus line, 201. Finally each driving IC chip (not shown in FIG. 5) is installed above the corresponding impedance matchers 204, and each impedance matcher 204 is electrically connected to input pads (not shown in FIG. 5) of the driving IC chips.

An impedance matcher of the third embodiment is shown in FIG. 6. A driving circuit of LCD comprises a bus line 301, composed of at least a metal wire, installed on the surface of a glass substrate 300, and a plurality of driving IC chips 302, installed on the surface of the glass substrate 300 above the bus line 301, are electrically connected to the bus line 301 via two input pads 303. Similar to the first embodiment, in the third embodiment an impedance matcher 304 is installed on the passivation layer 310 between the bus line 301 and the corresponding input pad 303, and via plugs 305 are installed between the bus line 301 and the corresponding impedance matchers 304. Each impedance matcher 304 is a resistance of a zigzag metal wire or an ITO layer, the bus line 301 is constituted by a first metal layer 301a and a second metal layer 301b, and the first metal layer 301a and the second layer 301b are electrically connected via a plurality of via plugs 312 between two metal layers. The bus line 301 can be produced in thin film transistor (not shown) manufacturing processes, therefore the first metal layer 301a and the gate of the TFT (not shown) can be formed simultaneously, the dielectric layer 311 and the gate insulator of the TFT (not shown) can be formed simultaneously, and the second metal layer 301b and the source/drain of the TFT (not shown) can be formed simultaneously. Thereafter a passivation layer 310 is formed to protect the TFT and the bus line 301.

Figure 7:
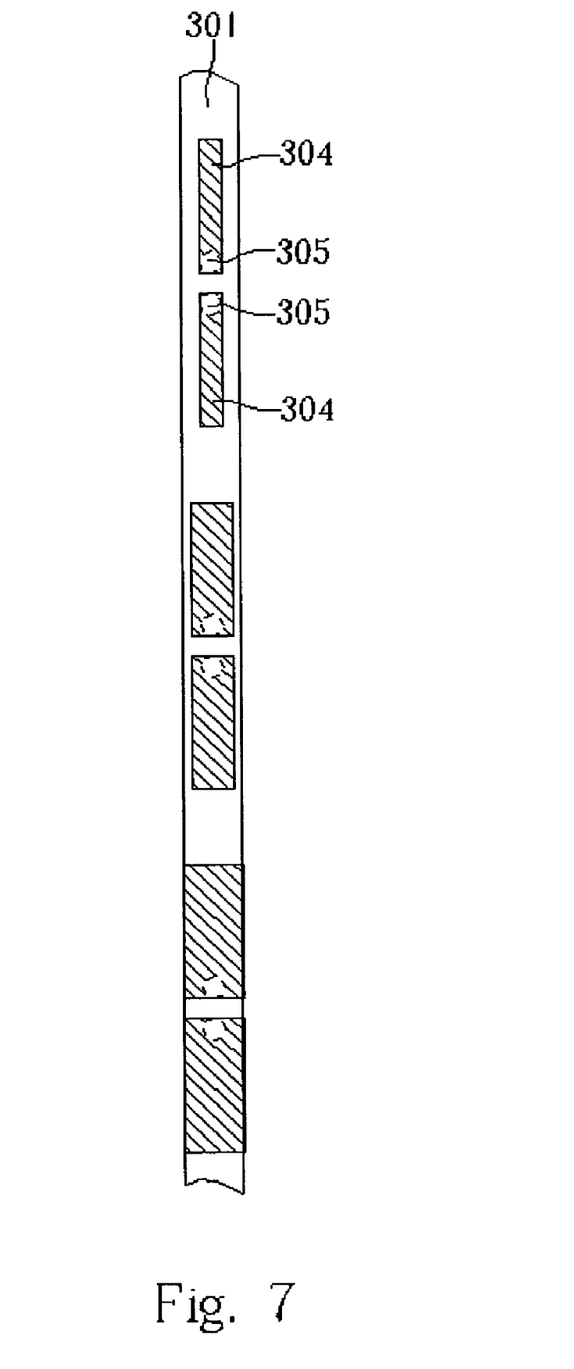
FIG. 7 is a top view of the impedance matcher shown in FIG. 6.

Differing from the first embodiment, in the third embodiment each impedance matcher 304 has the same length, and the position of each via plug 305 is fixed, thus the resistance value of each impedance matcher 304 can only be determined by adjusting the cross-section area. FIG. 7 is a top view of an impedance matcher shown in FIG. 6. As shown in FIG. 7, the bottom of each via plug 305 is electrically connected to the bus line 301, and the top is electrically connected to the corresponding impedance matchers 304, wherein each impedance matcher has same length but different cross-section area. Finally the driving IC chips (not shown in FIG. 7) are installed above the impedance matchers 304 and electrically connected to the input pad (not shown in FIG. 7) of each driving IC chip.

In a word, the present invention relates to provide a circuit of a WOA LCD, and more particularly, to a circuit wherein each driving IC chip obtain equal input voltage. In the present invention, an impedance matcher is installed between the bus line and the corresponding driving IC chip, and the resistance value of each impedance matcher is inversely proportional to the voltage drop of the bus line electrically connected to the driving IC chips. This allows each driving IC chip to obtain equal final input voltage from the bus line and solve the color diversity problem of the LCD.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A driving circuit of a liquid crystal display device, the driving circuit comprising a bus line and a plurality of driving IC chips serially connected to the bus line and installed on the surface of a glass substrate of the LCD device, and a plurality of impedance matchers installed between the bus line and each driving IC chip so that the driving IC chips obtain substantially equal input voltage from the bus line, wherein an impedance of each impedance matcher installed below the driving IC chip is inversely proportional to a voltage drop of the bus line electrically connected to the driving IC chips and is determined according to the position of the corresponding driving IC chip electrically connected thereto.

2. The driving circuit of claim 1, wherein the more the voltage drop, caused by a large resistance of the bus line formed on the glass substrate, of the bus line electrically connected to the driving IC chips is, the less the resistance value of the impedance matcher installed between the driving IC chips and the bus line is.

3. The driving circuit of claim 1, wherein the resistance is composed of an indium tin oxide layer.

4. The driving circuit of claim 1, wherein each driving IC chip comprises at least an input pad electrically connected to the bus line through the impedance matcher to obtain an equalized input voltage of each driving IC chip.

5. The driving circuit of claim 4, wherein quantities of the impedance matchers and the driving IC chips are equal.

6. The driving circuit of claim 4, wherein quantities of the impedance matchers and the input pads are equal.

7. The driving circuit of claim 1, wherein the impedance matcher is a resistance composed of a zigzag metal wire, and the resistance value of each impedance can be determined by adjusting the length or width of the zigzag wire.

8. The driving circuit of claim 1, wherein the impedance matcher is a resistance composed of a metal wire, and the resistance value of each impedance can be determined by adjusting the cross-section area of the metal wire.

9. The driving circuit of claim 1, wherein an impedance matcher branch connected to the impedance matcher via a plug, and the resistance value of each impedance can be determined by adjusting a cross-section area which the plug is connected to the corresponding impedance matcher branch with.

10. A wiring on array liquid crystal display, said LCD comprising:
   a LCD panel being composed of a bottom glass substrate and a top glass substrate; and
   a driving circuit for driving the LCD panel, the driving circuit further comprising:
      a bus line installed on the surface of the bottom glass substrate;
      a plurality of driving IC chips serially connected to the bus line and installed on the surface of the bottom glass substrate and above the bus line, each driving IC chip comprising at least an input pad for electrically connecting to the bus line; and
      a plurality of impedance matchers installed between the bus line and below the driving IC chips, and each driving IC chip for adjusting a voltage drop of the bus line so as to allow each input pad of the driving IC chips to obtain substantially equal voltage from the bus line;
      wherein an impedance of each impedance matcher is inversely proportional to the voltage drop of the bus line electrically connected to the driving IC chips and is determined according to the position of the corresponding driving IC chip.

11. The LCD of claim 10, wherein the more the voltage drop, caused by a large resistance of the bus line formed on the glass substrate, of the bus line electrically connected to the driving IC chips is, the less the resistance value of the impedance matcher installed between the driving IC chips and the bus line is.

12. The LCD of claim 10, wherein the resistance is composed of an ITO layer.

13. The LCD of claim 10, wherein the quantities of impedance matchers and input pads are equal.

14. The LCD of claim 10, wherein the quantities of impedance matchers and driving IC chips are equal.

15. The driving circuit of claim 10, wherein the impedance matcher is a resistance composed of a zigzag metal wire, and the resistance value of each impedance can be determined by adjusting the length or width of the zigzag wire.

16. The driving circuit of claim 10, wherein the impedance matcher is a resistance composed of a metal wire, and the resistance value of each impedance can be determined by adjusting the cross-section area of the metal wire.

17. The driving circuit of claim 10, wherein an impedance matcher branch connected to the impedance matcher via a plug, and the resistance value of each impedance can be determined by adjusting a cross-section area which the plug is connected to the corresponding impedance matcher branch with.

18. A wiring on array liquid crystal display, said LCD comprising:
    a LCD panel being composed of a bottom glass substrate and a top glass substrate; and
    a driving circuit for driving the LCD panel, the driving circuit further comprising:
        a driving voltage source for providing an input voltage for driving IC chips;
        a bus line installed on the surface of the bottom glass substrate;
        a plurality of driving IC chips installed on the surface of the bottom glass substrate and above the bus line, and each driving IC chip comprising at least an input pad for electrically connecting to the bus line; and
        a plurality of impedance matchers installed between the bus line and each driving IC chip for adjusting a voltage drop of the bus line so that the input pad of each driving IC chips obtains an substantially equal input voltage from the driving voltage source through the bus line;
    wherein each impedance matcher between the driving IC chips and the bus line is inversely proportional to the voltage drop of the bus line electrically connected to each driving IC chip and is determined according to the position of the corresponding driving IC chip.

19. The LCD of claim 18, wherein the more the voltage drop, caused by a large resistance of the bus line formed on the glass substrate, of the bus line electrically connected to the driving IC chips is, the less the resistance value of the impedance matcher installed between the driving IC chips and the bus line is.

20. The LCD of claim 18, wherein the resistance is composed of an ITO layer.

21. The LCD of claim 18, wherein the quantities of impedance matchers and input pads are equal.

22. The LCD of claim 18, wherein the quantities of impedance matchers and driving IC chips are equal.

23. The driving circuit of claim 18, wherein the impedance matcher is a resistance composed of a zigzag metal wire, and the resistance value of each impedance can be determined by adjusting the length or width of the zigzag wire.

24. The driving circuit of claim 18, wherein the impedance matcher is a resistance composed of a metal wire, and the resistance value of each impedance can be determined by adjusting the cross-section area of the metal wire.

25. The driving circuit of claim 18, wherein an impedance matcher branch connected to the impedance matcher via a plug, and the resistance value of each impedance can be determined by adjusting a cross-section area which the plug is connected to the corresponding impedance matcher branch with.

* * * * *